United States Patent
Adams

(10) Patent No.: US 10,948,920 B2
(45) Date of Patent: Mar. 16, 2021

(54) METHODS AND SYSTEMS FOR AUTONOMOUS VEHICLE REFUELLING

(71) Applicant: BlackBerry Limited, Waterloo (CA)

(72) Inventor: Neil Patrick Adams, Waterloo (CA)

(73) Assignee: BlackBerry Limited, Waterloo, CA (US)

( * ) Notice: Subject to any disclaimer, the term of this patent is extended or adjusted under 35 U.S.C. 154(b) by 744 days.

(21) Appl. No.: 15/684,905

(22) Filed: Aug. 23, 2017

(65) Prior Publication Data

US 2019/0064834 A1 Feb. 28, 2019

(51) Int. Cl.
*G05D 1/02* (2020.01)
*G05D 1/00* (2006.01)
*G06Q 10/00* (2012.01)
*G07C 5/00* (2006.01)

(52) U.S. Cl.
CPC ......... *G05D 1/0225* (2013.01); *G05D 1/0088* (2013.01); *G06Q 10/00* (2013.01); *G07C 5/008* (2013.01); *G05D 2201/0213* (2013.01)

(58) Field of Classification Search
CPC ......... G05D 2201/0213; G05D 1/0225; G05D 1/0088; G07C 5/008; G06Q 10/00
See application file for complete search history.

(56) References Cited

U.S. PATENT DOCUMENTS

| | | | |
|---|---|---|---|
| 9,365,128 B2 | 6/2016 | Sarkar et al. | |
| 9,552,578 B2 | 1/2017 | Ghosh | |
| 10,042,359 B1* | 8/2018 | Konrardy | B60W 30/12 |
| 2009/0289113 A1 | 11/2009 | Vilnai et al. | |
| 2011/0029157 A1* | 2/2011 | Muzaffer | B60L 58/16 |
| | | | 701/2 |
| 2014/0067660 A1 | 3/2014 | Cornish | |
| 2015/0242855 A1* | 8/2015 | Vilnai | G07F 13/025 |
| | | | 705/44 |
| 2015/0348335 A1 | 12/2015 | Ramanujam | |
| 2017/0192428 A1* | 7/2017 | Vogt | G05D 1/0238 |
| 2018/0361870 A1* | 12/2018 | Zhao | H02J 7/0029 |
| 2019/0265719 A1* | 8/2019 | Qiu | B60L 53/68 |
| 2020/0180571 A1* | 6/2020 | Lei | B60S 5/02 |
| 2020/0317216 A1* | 10/2020 | Konrardy | G05D 1/0088 |

OTHER PUBLICATIONS

International Searching Authority, International Search Report and Written Opinion for International Application No. PCT/CA2018/050937, dated Oct. 23, 2018.

* cited by examiner

*Primary Examiner* — Behrang Badii
(74) *Attorney, Agent, or Firm* — Moffat & Co

(57) ABSTRACT

A method at an autonomous vehicle for signaling a refueling attendant, the method including confirming that the autonomous vehicle is proximal to a refueling station; providing a signal to the refueling attendant; waiting for refueling to commence; and if, after a threshold period, refueling has not commenced, repeating the providing the signal.

20 Claims, 8 Drawing Sheets

METHODS AND SYSTEMS FOR AUTONOMOUS VEHICLE REFUELLING

FIELD OF THE DISCLOSURE

The present disclosure relates to autonomous vehicles, and in particular relates to the refueling of autonomous vehicles.

BACKGROUND

Autonomous vehicles are likely to become widely used in coming years. Such autonomous vehicles may be used for many purposes, including autonomous deliveries, autonomous taxicabs, vehicle sharing infrastructures in which the vehicle relocates itself in between users, among other options.

Autonomous vehicles would be powered through one or more of a variety of sources. Options may include gasoline, diesel, or electric power, among others. It is foreseen that different autonomous vehicles would use different types of power for various reasons. For example, gas or diesel would allow further travel with today's technology and provides the needed power for hauling heavy loads.

However, if the autonomous vehicle has no passenger or other person associated with it, then refueling may be difficult. For example, in an autonomous delivery vehicle, a company would unlikely want to hire someone to periodically fill up the vehicle with gasoline, as this would create an added expense.

BRIEF DESCRIPTION OF THE DRAWINGS

The present disclosure will be better understood with reference to the drawings, in which.

DETAILED DESCRIPTION

Figure 1:
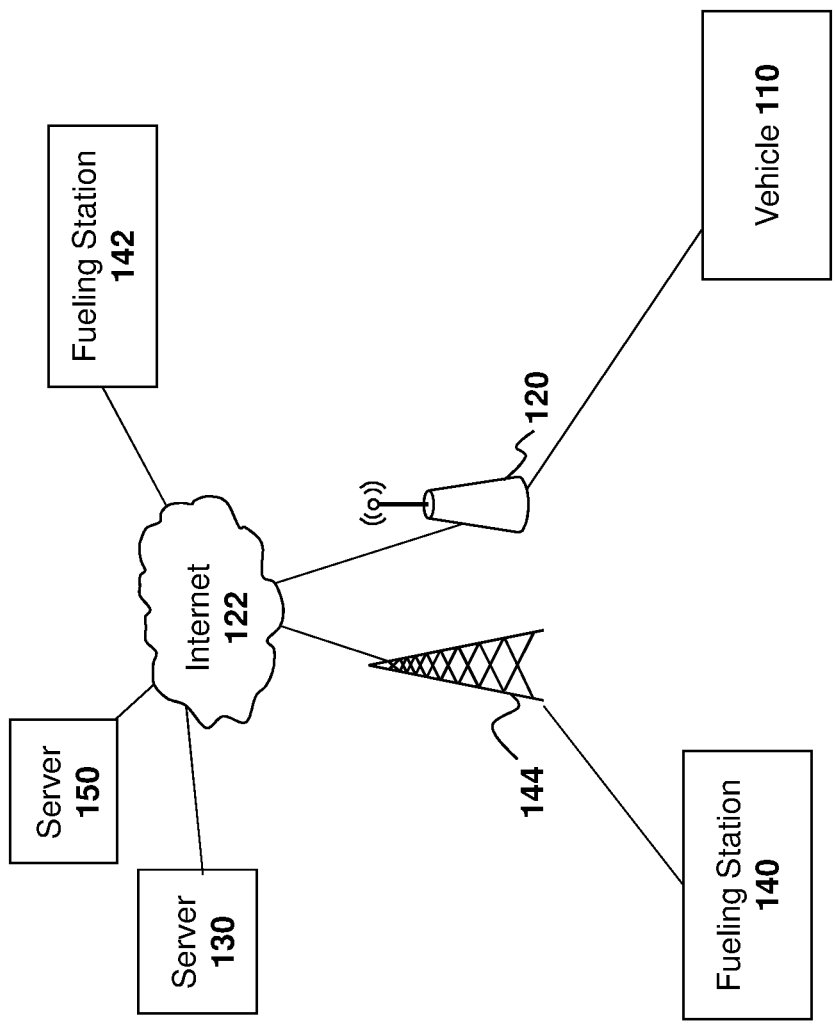
FIG. 1 is a block diagram showing an example system for scheduling a vehicle at a refueling station.

The present disclosure provides a method at an autonomous vehicle for signaling a refueling attendant, the method comprising: confirming that the autonomous vehicle is proximal to a refueling station; providing a signal to the refueling attendant; waiting for refueling to commence; and if, after a threshold period, refueling has not commenced, repeating the providing the signal.

The present disclosure further provides a computing device associated with an autonomous vehicle for signaling a refueling attendant, the computing device comprising: a processor; and a communications subsystem, wherein the computing device is configured to: confirm that the autonomous vehicle is proximal to a refueling station; provide a signal to the refueling attendant; wait for refueling to commence; and if, after a threshold period, refueling has not commenced, repeat the providing the signal.

The present disclosure further provides a computer readable medium for storing instruction code for signaling a refueling attendant, which when executed by a processor of a computing device associated with an autonomous vehicle cause the computing device to: confirm that the autonomous vehicle is proximal a refueling station; provide a signal to the refueling attendant; wait for refueling to commence; and if, after a threshold period, refueling has not commenced, repeat the providing the signal.

One issue for autonomous vehicle refueling relates to payment for the refueling. In accordance with one embodiment of the present disclosure, payment may be made using short range communications, such as near field communications (NFC). For example, an NFC payment reader may be integrated into a gas line nozzle and a payment card or chip may be included inside a gas door. In this case, when the gas nozzle is inserted far enough into the gas door, the reader and chip may make a connection and payment may be made upon verification of the credentials. Such system avoids a second, separate, system to make a connection for payment purposes.

A further issue for autonomous refueling involves the actual pumping of the fuel or the attachment of the fuel mechanism. In this case, an attendant needs to know when an autonomous vehicle is present and ready for refueling. This is especially true since most stations today are self-serve.

In order to accomplish refueling using an attendant, in accordance with one embodiment of the present disclosure, an autonomous vehicle may have a signaling mechanism such as a flashing light or audio feature in order to get an attendant's attention. In alternative embodiments, a wireless connection system may be provided in which a device inside an attendant station or associated with an attendant is signaled when a vehicle is ready to be refueled. Such signaling system can also schedule vehicles for refueling to avoid several vehicles arriving at the same time.

A further issue for autonomous vehicle refueling involves ensuring a vehicle is receiving the correct fuel from a correct vendor and making the payments to the correct vendor. For example, the owners of the autonomous vehicle do not want to be making payments to anyone that has purchased a gas nozzle and accepting payment for filling the vehicle of something other than the correct fuel. In order to avoid such situation, in one embodiment of the present disclosure, a short-range communication system, such as an NFC reader chip, may be used at the fueling door. In this case, when a communication connection is made, a vehicle may issue challenge and a response from the vendor may be received in order to verify the identity of the vendor. If the response is verified, a fueling door may be opened and payment may be made. Otherwise the fuel door is kept closed and payment is not made.

In one embodiment, the short-range communications system may reuse the payment system on a gas nozzle. Other embodiments may include a tap of a separate card or module before the fuel door is opened.

Reference is now made to FIG. 1, which shows an example architecture in accordance with the embodiments of the present disclosure. In particular, in the embodiment of FIG. 1, a vehicle 110 is an autonomous vehicle. As provided in more detail below, vehicle 110 includes a processor and a communications subsystem which allows it to communicate, for example through a access point or base station 120 with Internet 122. In other embodiments, vehicle 110 may communicate with Internet 122 through any short or long range communications system, including satellite, cellular, Wi-Fi, NFC, among other options.

Vehicle 110 may be related to a server 130. For example, if vehicle 110 is a delivery vehicle, server 130 may be a fleet management server which manages a fleet of such autonomous vehicles.

In accordance with the embodiments of the present disclosure, vehicle 110 realizes that it needs fuel. For example, if vehicle 110 is a gas or diesel powered vehicle, it may have sensors within the gas tank, and once a level of gas falls below a threshold, the vehicle 110 may start searching for gas stations at which to refuel. If vehicle 110 is conversely an electric vehicle, it may have monitors on the battery to determine when the battery level falls below a threshold level.

Once the threshold for refueling is reached, vehicle 110 may try to locate a gas station or other refueling station. For example, in the embodiment of FIG. 1, refueling stations 140 and 142 are shown in the vicinity of vehicle 110.

In accordance with the embodiment of FIG. 1, refueling stations 140 and 142 may communicate over Internet 122 with various entities, including a server 150. The communications between the refueling station 142 and Internet 122 may, for example, be through a wired connection such as Ethernet, or may be over a wireless connection. For example, refueling station 140 may communicate using a base station 144.

Server 150 may be a server or combination of servers that provide functionality for the refueling of autonomous vehicles. In this case, if refueling stations 140 and 142 are capable of handling autonomous vehicles, they may register with server 150 and may further provide a server 150 with updates as to the status and availability for refueling at the station.

Similarly, vehicle 110 may register with server 150 and may request information with regard to refueling stations in its vicinity.

Figure 2:
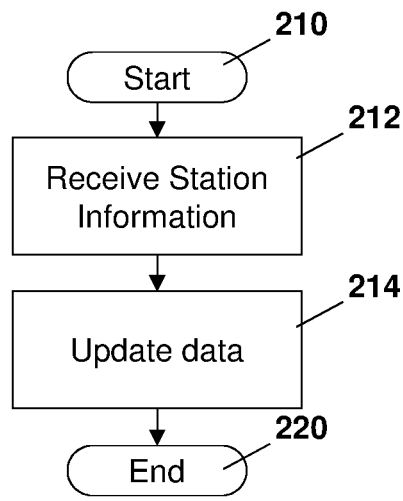
FIG. 2 is process diagram showing a process at a server for maintaining refueling station information.

For example, reference is now made to FIG. 2. In the embodiment of FIG. 2, a server such as server 150 starts the process at block 210 and proceeds to block 212 in which information from one of a plurality of refueling stations is received. For example, refueling station 140 may signal to server 150 that it is capable of handling autonomous vehicles, that it is capable of handling autonomous vehicles for limited time periods, that it is currently servicing other vehicles and does not have a pump for an autonomous vehicle, details about the station such as where pumps are located and those best suited to autonomous vehicles, among other information.

The process may then proceed to block 214 in which the information about the station sending the message received at block 212 is updated.

The process then proceeds to block 220 and ends.

Therefore, in accordance with the embodiment of FIG. 2, a server such as server 150 may keep a record of a plurality of refueling stations and the capabilities of such refueling stations to handle autonomous vehicles.

Figure 3:
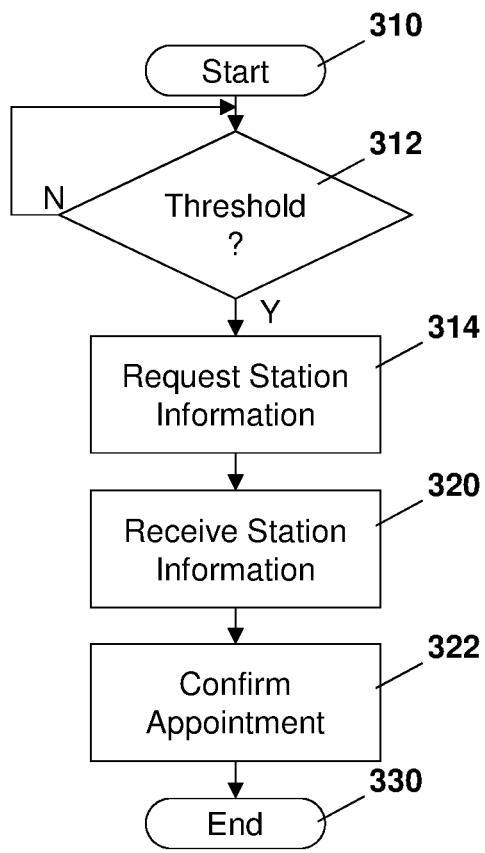
FIG. 3 is a process diagram showing a process at an autonomous vehicle for scheduling an appointment at a refueling station using a central server.

Referring to FIG. 3, a vehicle such as vehicle 110 starts the process at block 310 and proceeds to block 312 in which a check at the vehicle is made to determine whether a threshold for refueling has been met. For example, if the gas tank on the vehicle is less than one quarter full or if the battery on the vehicle indicates less than 50 km remaining then the check at block 312 may be met. Otherwise, the process proceeds back to block 312 until the threshold is met.

In other examples the threshold may be combined with other criteria. For example, for an autonomous taxi, the threshold may be met only when the fuel level is below a value and there are no passengers. In this case the threshold fuel level may be set to a higher value to allow for passenger trips to be completed.

In other cases, multiple thresholds may exist. For example, when an autonomous taxi detects it is below ⅓ of a tank it may check and defer refueling if a passenger is present. However, if the fuel reading reaches ⅛ of a tank, refueling may be initiated, regardless of whether a passenger is present.

In other cases, refueling may occur, regardless of the amount of fuel currently in the vehicle, in preparation for a trip. For example, a taxi may be ⅞ full, but at the end of the day may refuel anyway to prepare for the next day. Similarly, an autonomous delivery vehicle may refuel between deliveries, regardless of fuel level.

Other examples and thresholds are possible, and the above examples are provided for illustration only.

Once the threshold is met, the process proceeds to block 314 in which the vehicle 110 requests refueling station information from server 150. The request at block 314 may ask for either a single station or may ask for a variety of choices of stations within a geographic boundary area, for example. The request at block 314 may include the position of the vehicle 110, along with identifiers.

Further, in some cases, the request at block 314 may include other supplemental information. For example, the vehicle 110 may belong to a fleet that has an agreement with a particular owner or brand of refueling stations and in this case, the request at block 314 may indicate a preference for specific brands of stations. In other cases, the request at block 314 may indicate a type of fuel desired, the grade of fuel desired, among other such information.

The vehicle 110 then receives information at block 320 about one or more stations that can service the vehicle. In some cases, the information may include supplementary information about the station, such as location of a particular pump that the vehicle should use.

Based on the information received at block 320, the process proceeds to block 322 in which the vehicle may confirm an appointment for refueling with a station chosen from the received station information at block 320.

The process then proceeds to block 330 and ends.

Figure 4:
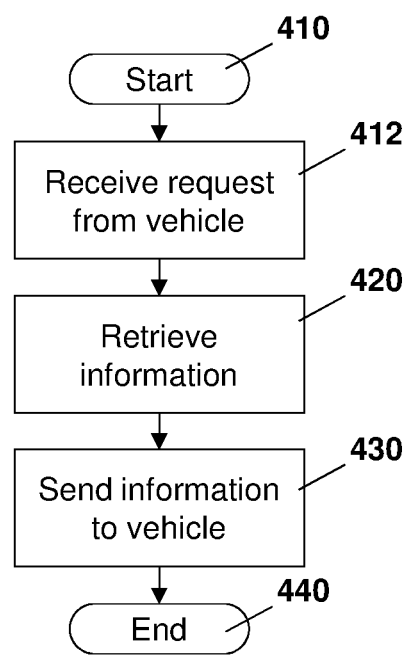
FIG. 4 is a process diagram showing a process at a central server for providing information to an autonomous vehicle.

At the server side, a process is shown with regard to FIG. 4. In the process of FIG. 4, the process starts at block 410 and proceeds to block 412 in which a request from a vehicle is received. As indicated with regard to block 314, the request may include information about the vehicle, the types of stations that the vehicle would like to use, the geographic area of the vehicle, the grade of fuel of the vehicle, how far the vehicle can travel with its remaining fuel, or other information. However, such examples are not limiting, and in other cases more or less information may be provided in the request received at block 412

From block 412 the process proceeds to block 420 in which the information about available stations is retrieved. This may be done, for example, utilizing a database search and using criteria received in the message at block 412.

In some cases, if there are no stations within the vicinity of the vehicle matching all of the criteria of message 412, stations that match a high percentage of the criteria may be returned. In other cases, certain types of criteria may be considered essential, such as a fuel type, while other criteria may be optional, such as a brand of fueling station. Based the provided criteria, results matching as closely as possible may be obtained.

From block 420 the process proceeds to block 430 in which the retrieved information is then sent back to the vehicle. Other information such as price of fuel, estimated wait time, or traffic conditions or hazards between the current location of the vehicle and the station, among other possible supplemental information, could be provided in the message of block 430.

From block 430 the process proceeds to block 440 and ends.

Therefore, in accordance with processes of FIGS. 2 to 4, a central server 150 may keep a record of refueling stations, their geographic locations, their capabilities, their scheduling, among other information and may then match requests from vehicles 110 with the appropriate stations. The server may provide a list of one or more available stations back to a vehicle 110 upon request. In this case, if the vehicle receives more than one station it may make a selection based on various criteria including the geographic locations, the price of the fuel, the owner of the station, historical data on previous service, among other options.

Referring again to FIG. 1, instead of a central server providing information with regard to refueling stations, in some embodiments vehicle 110 may query stations directly or through the use of a fleet management server 130.

Figure 5:
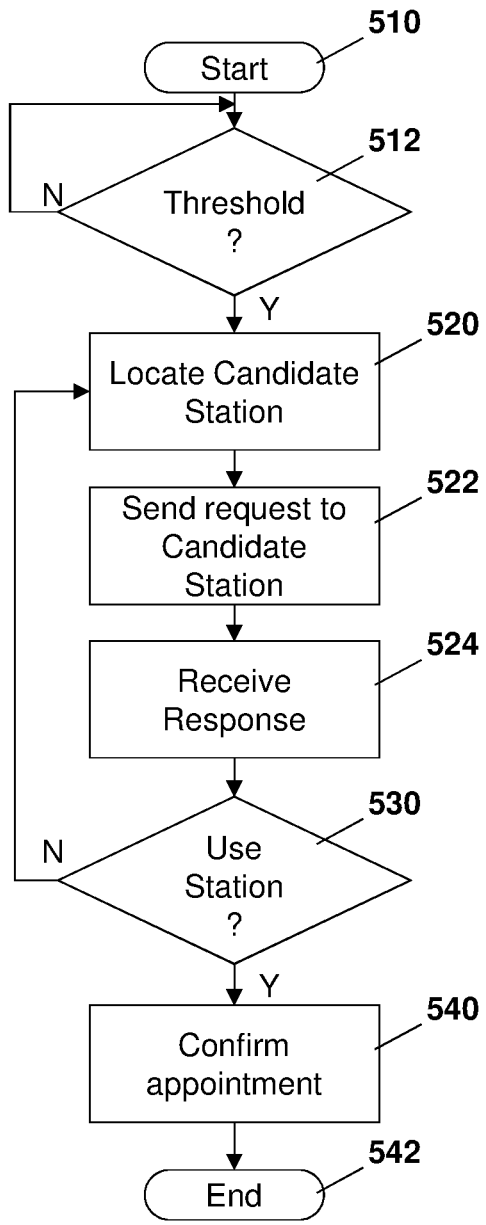
FIG. 5 is a process diagram showing a process at an autonomous vehicle for selecting a refueling station and scheduling an appointment.

Reference is now made to FIG. 5, which illustrates a process at a vehicle for locating and booking an appointment with a station. The process starts at block 510 and proceeds to block 512 in which a determination is made on whether or not the vehicle needs to refuel. For example, the refueling may be based on a threshold level of fuel or charge the vehicle has remaining. As with the check at block 312 of FIG. 3, other information such as passenger status, upcoming driving needed, time of day, among other information, could also be used in the check of block 512.

If, at block 512, it is determined that the threshold is not met, then the process may continue to loop back to block 512 until the threshold is met.

From block 512, the process proceeds to block 520 in which a refueling station is located. The location of the station may be based on various criteria including the current location of the vehicle, as well as the location and availability of the refueling stations. For example, vehicle 110 may keep a database of refueling stations that serve autonomous vehicles and may then refer to this database to find a candidate station. In other embodiments, vehicle 110 may query server 130 for available stations in the geographic location to find a candidate station and may receive from server 130 such candidate stations. Other options for determining a candidate refueling station are possible.

From block 520, once a candidate station has been located the process proceeds to block 522 in which a request is sent to the candidate station. Such request may include various information, including but not limited to an indication that the vehicle is an autonomous vehicle, the type of fuel required, and/or the time window for the refueling requested.

In response to the message sent at block 522, the vehicle receives a response at block 524. The response might contain information such as availability, whether the station has the correct type of fuel or charging station, the price of the fuel, or other such information.

A processor on a vehicle 110 may then analyze the response and at block 530 determine whether the candidate station is appropriate and whether it should therefore be used for refueling. For example, if the response received at block 524 indicates that the station is currently not available, that it does not have the appropriate fuel, that it cannot accommodate an autonomous vehicle for a certain time period, or that the price of fuel is higher than a threshold value, the process may proceed from block 530 back to block 520 in which a different candidate station may be located.

Conversely, if at block 530 it is determined that the station can meet the autonomous vehicle's needs, the process may proceed to block 540 in which a appointment with the refueling station may be confirmed. The process then proceeds to block 542 and ends.

Figure 6:
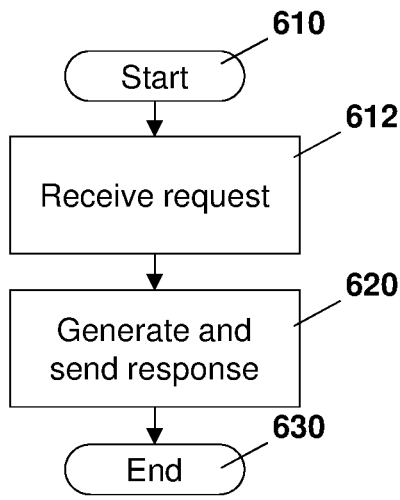
FIG. 6 is a process diagram showing a process at a refueling station or server for a refueling station for responding to requests from vehicles.

Reference is now made to FIG. 6, which shows a process at the refueling station. The process of FIG. 6 starts at block 610 and proceeds to block 612 in which the request from the vehicle is received.

The process then proceeds to block 620 in which a response is generated based on the contents of the request. For example, if the request asks for a particular time window, for the capabilities with regard to autonomous vehicles, for a particular fuel type or grade, among other information, the response generated at block 620 may be based on the capabilities of the refueling station, previous scheduling at the refueling station, prices at the refueling station, among other information.

The response is then sent at block 620 and the process proceeds to block 630 and ends.

While the embodiment above shows the query to the actual refueling station, in some cases, the refueling station may be served by a server for either the refueling station itself or for a plurality of refueling stations. For example, a particular vendor may have multiple refueling stations but have a single server providing information back to a vehicle based on the query. Other examples are possible.

A vehicle may then arrive at a refueling station. The station may be aware of the vehicle's arrival based on the appointment confirmed at blocks 322 or 540. However, in some embodiments the process of FIGS. 2 to 5 may be omitted and a vehicle may arrive unannounced at a refueling station.

Figure 7:
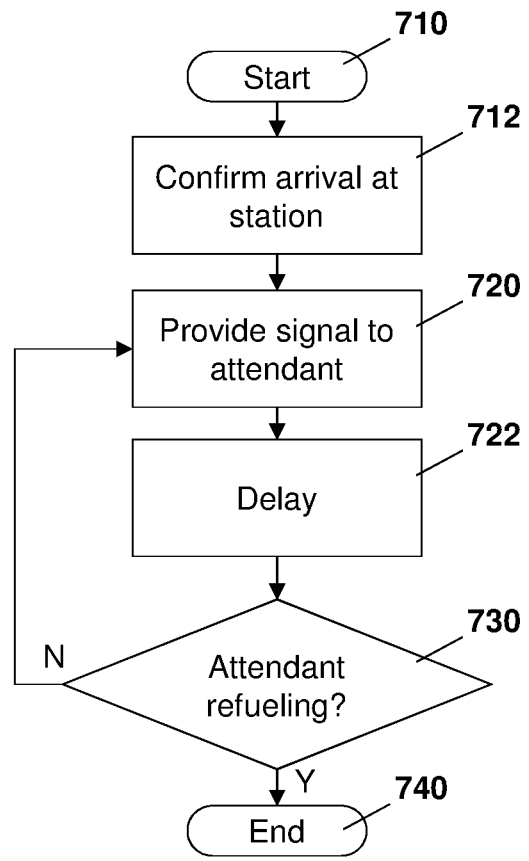
FIG. 7 is a process diagram showing a process at an autonomous vehicle for signaling an attendant that the vehicle has arrived at a refueling station and needs refueling.

Reference is now made to FIG. 7 in which a process from a vehicle's perspective is provided with regard to the arrival at the refueling station. In particular, the process starts at block 710 and proceeds to block 712 in which a processor on the vehicle confirms that the vehicle has arrived at the refueling station. Such confirmation may be based on a location sensor on the vehicle. For example, if the vehicle is within a geographic boundary of the refueling station, this may indicate that the vehicle is proximal to the station and provide confirmation. In other embodiments, the confirmation at block 712 may be a visual confirmation based on characteristics of the refueling station. In other embodiments, the refueling station may provide a short-range communication signal that may be detected by the vehicle. Other examples are possible.

Once the vehicle confirms it has arrived at the refueling station, the process proceeds to block 720 in which a signal is provided to an attendant that the autonomous vehicle needs to be refueled.

In accordance with one embodiment of the present disclosure, the signal may be a visual signal to the attendant. For example, this may include a light on the top of the vehicle to signal an attendant, which may start to flash when the vehicle needs to be refueled. The signal may further include the flashing of the front or brake lights of the vehicle. Other visual signals are possible.

In other embodiments, the signal may be an audio signal. For example, the vehicle may honk its horn or provide an audible signal through a speaker system on the vehicle.

In other embodiments, the audio and visual signals may be combined to get the attention of the attendant.

In still further embodiments, the signal may be a wireless signal to the attendant. For example, the attendant station may include a receiver which may provide audio, visual or sensory signals to an attendant that the autonomous vehicle has arrived.

Figure 8:
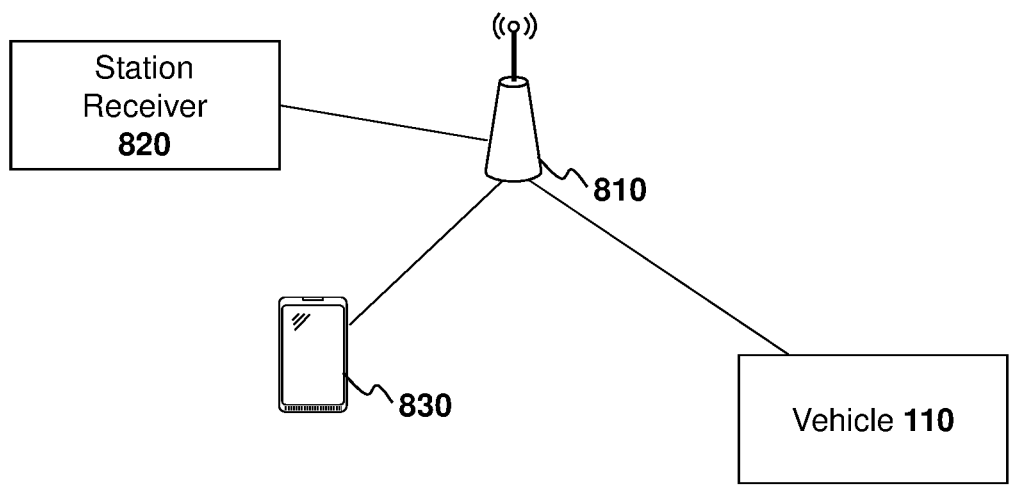
FIG. 8 is a block diagram showing a short-range communications system at a refueling station for alerting an attendant.

For example, reference is now made to FIG. 8. In the embodiment of FIG. 8, a vehicle 110 may see a short-range communication system associated with the refueling station. In particular, such short-range communication system may have an access point 810 which the vehicle 110 may register with. Upon registration, a station receiver 820 may be provided with the signal that the registration of the vehicle has occurred and may therefore provide an audio, visual or sensory alert to an attendant at the station.

In one embodiment, station receiver 820 may be fixed. In other embodiments, the station receiver may be a mobile device carried by an attendant such as mobile device 830. In some embodiments, mobile device 830 may register to receive alerts. For example, the mobile device 830 may have an application that registers to receive alerts in one embodiment. The registration may include a connection to a particular server in one case. In other cases, registration may include a near field communication (NFC) signal. For example, the mobile device may use NFC to register with the station receiver 820 in order to register the device to receive alerts. Other options are possible.

Rather than a short-range communication system, in other cases, vehicle 110 may register with the station receiver 820 using cellular signals or other access points. For example, the station receiver 820 may register with a particular server and vehicle 110 may look up the address of the station receiver utilizing a similar server or through its vehicle or fleet management server 130.

Other options are possible.

Referring again to FIG. 7, once the signal is provided to the attendant at block 720, the process proceeds to block 722 in which a delay is introduced. After the delay, the process proceeds to block 730 in which a check is made to determine whether the attendant has started refueling the vehicle. For example, as described below, the refueling may be detected by the fuel nozzle being held in proximity to the fuel door.

If the attendant has not started refueling the vehicle then the process proceeds back to block 720 in which the signal is provided again to the attendant. In this way, the signal may be provided with a periodic delay in order to get the attendant's attention.

Once the attendant has started refueling the process proceeds to block 740 and ends.

In some cases, multiple vehicles may arrive at a refueling station at the same time. In this case, the signal provided at block 720 may be request for fueling to the refueling station and the response from the station receiver may indicate that the vehicle has been placed in a queue and needs to wait. For example, a designated waiting area may be provided at the station.

Once the queue has reached the vehicle, the station receiver 820 may provide a signal to the vehicle to move to a pump. In this case, rather than proceeding to block 730 in which a check is made whether the attendant has started refueling, the signal from the receiver 820 may be sufficient to indicate that the attendant is aware of the vehicle.

Other options are possible.

Figure 9:
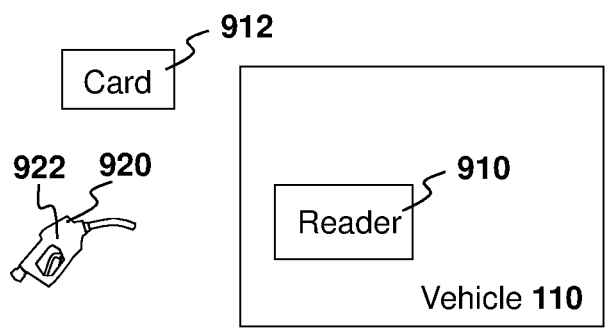
FIG. 9 is a block diagram showing near field communications readers and tags for securing a fueling port.

Once the attendant has been signaled, refueling may begin. In one embodiment, security at the vehicle may be used to ensure that fraudulent transactions are not occurring. In particular, the vehicle may wish to avoid someone other than a legitimate attendant at the station from accessing the fuel system in order to retrieve payment and also to avoid the vehicle being filled with something other than the desired fuel. In this case, security may be provided at the vehicle refueling port. Reference is now made to FIG. 9.

In the embodiment of FIG. 9, a vehicle 110 includes an NFC reader 910. NFC reader 910 may be on or around the fuel port on the vehicle. In this case, a system may be provided in which the door to the refueling port may be locked until an NFC challenge is successfully completed Specifically, in one embodiment, an attendant at a refueling station may have an NFC enabled smart card 912 which includes an NFC chip associated with it. The attendant may, prior to fueling, place the NFC enabled smart card 912 in the vicinity of the NFC reader 910. The NFC reader 910 may then provide a challenge to the NFC enabled smart card 912 and may receive a response back. The response may then be verified prior to the fuel door being opened.

For example, in one embodiment, the NFC reader may provide a challenge to the NFC enabled smart card 912 and may compare the response with an expected response. For example, reader 910 would generate a random number and send it to the NFC enabled smart card 912. The NFC enabled smart card 912 would sign the number (or "challenge") with a private key and then the reader 910 would verify the challenge with a public key. Thus, in some embodiments, the challenge in response may be based on encryption/signing or security algorithms.

In other embodiments, an NFC enabled smart card 920 may be associated with a fuel nozzle 922. Thus, instead of using a separate card, the NFC enabled smart card 920 may be placed in the vicinity of NFC reader 910 by holding the fuel nozzle close to the vehicle. NFC enabled smart card 920 may similarly be challenged or asked to provide information back to reader 910, as described above with regards to the NFC enabled smart card 912.

In other embodiments, other locations for an NFC enabled smart card are possible.

In still further embodiments, those skilled in the art will appreciate that other short range communications technologies instead of an NFC enabled smart card could be utilized to verify the fuel provider.

While the above challenges may be passive, in some cases, information, for example based on the booking or based on codes exchanged between the vehicle and the station, may be utilized as part of the challenge.

Once the NFC reader 910 verifies the information at either NFC enabled smart card 912 or 920, the fuel door may be opened at the vehicle 110.

In other embodiments, the fuel door of the vehicle may be opened without requiring short range security verification.

Figure 10:
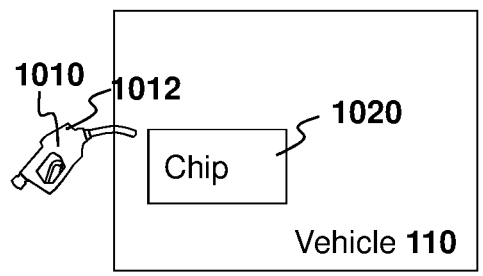
FIG. 10 is a block diagram showing near field communications readers and tags for providing payment for fueling.

Once the fuel door is opened, payment for the fueling may occur. Reference is now made to FIG. 10.

In the embodiment of FIG. 10, a reader 1012 can be included on the fuel nozzle 1010. In particular, in the example of FIG. 10, the reader 1012 is shown at the front of the fuel nozzle handle. However, in other embodiments it might be somewhere else on fuel nozzle 1010.

The reader 1012 on the fueling nozzle 1010 may then be placed in proximity to the fuel port when fueling nozzle 1010 is inserted into the fuel line on vehicle 110.

In this case, an NFC enabled payment card 1020 associated with the vehicle may act as an NFC chip for the payment transaction as described below. For example, the NFC enabled payment card 1020 may be provided near the fuel port of vehicle 110.

In other embodiments, other locations for an NFC enabled payment card are possible.

In still further embodiments, those skilled in the art will appreciate that other short range communications technologies instead of an NFC enabled payment card could be utilized to verify the fuel provider.

Reader 1012 may then interact with the NFC enabled payment card 1020 to obtain payment. Thus, when the fuel nozzle is inserted far enough into the fuel line of the vehicle, the reader and NFC enabled payment card may make a connection and payment may be made.

In one embodiment, the payment card 1020 may not be activated until a fuel door is opened or authentication of the vendor has been completed. This prevents NFC communications prior to the authentication for additional security for the payment system.

In other embodiments, the payment card 1020 may be located in a layer of materials that prevents the card from being read. For example, the fuel door may be lined or comprise a material to ensure the card cannot be read without access to inside of the fuel door. Such system assumes that the fuel door has a locking mechanism to prevent access until an event such as a vendor authentication has occurred. Such embodiment prevents NFC communications while the fuel door is closed and thereby provides additional security for the payment system by avoiding someone walking by the vehicle and scamming the payment card 1020.

Payment may be based on a challenge and response and may, for example, include a prepayment prior to refueling. The prepayment can then be converted into a payment once fueling has finished and the amount of fuel has been registered. In some embodiments, the payment or prepayment may be done through the booking system instead.

Similarly, for electric vehicles, the NFC enabled payment card 1020 can be associated with the recharging port and the reader 1012 may be part of the charging cable. In this case, payment can be made in a similar way to the gas payment system described above.

Once fueling has completed, a payment system for the station can complete the transaction by identifying the amount of fuel or duration of charge provided, and thereby complete the transaction.

In accordance with one embodiment of the present disclosure, vehicle 110 may also have sensors to detect the amount of fuel added to the vehicle. This may be either the duration and amount of charge added or the amount of gasoline or diesel fuel added to the vehicle. Such detection can be used to compare the charges made against the charges expected, and could lead to dispute resolution mechanisms in cases of large discrepancies.

Figure 11:
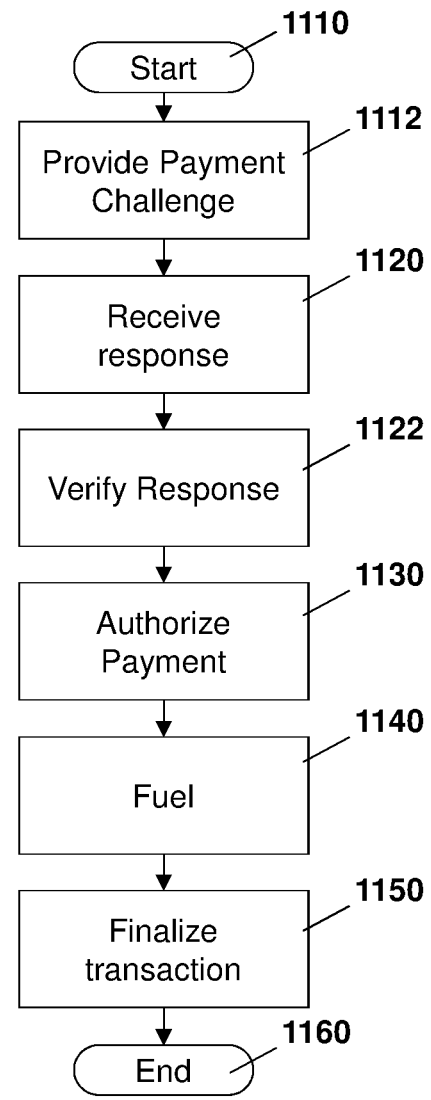
FIG. 11 is a process diagram showing a process at a refueling station for providing payment for fueling.

Reference is now made to FIG. 11, which shows a process from the refueling station's perspective. The process of FIG. 11 starts a block 1110 and proceeds to block 1112 in which the NFC reader associated with the fuel nozzle provides a payment challenge to the vehicle. As described above, the challenge may be made to payment card that is associated with the fuel tank of the vehicle.

The reader then receives a response a block 1120 and the response is verified at block 1122.

Once the response is verified, a payment authorization may be made at block 1130. For example, such payment authorization may include communications between a refueling station and a bank or credit card company based on the payment information received at block 1120. The payment may, for example, be a preauthorization for a certain dollar amount. Further, in some cases a maximum amount may be configured based on an amount of fuel needed and the price of the fuel.

The process then proceeds to block 1140 in which the fueling occurs.

Once fueling is completed or the maximum dollar amount has been reached, the process then proceeds to block 1150 in which the payment is finalized. In particular, the authorized payment may be for a maximum amount of fuel that is allowed to be transferred to the vehicle but the fueling at block 1140 may be less than this amount. Therefore, payment will be based on the amount of fuel actually transferred to the vehicle and the payment may be finalized based on this actual amount at block 1150.

From block 1150 the process proceeds to block 1160 and ends.

The above description therefore provides for methods and systems for refueling autonomous vehicles.

The autonomous vehicle 110, as well as server 130, server 150, processors at fueling stations 140 and 142, receiver station 820, device 830 may user any computing device. For example, one simplified computing device that may perform the embodiments described above is provided with regards to FIG. 12.

Figure 12:
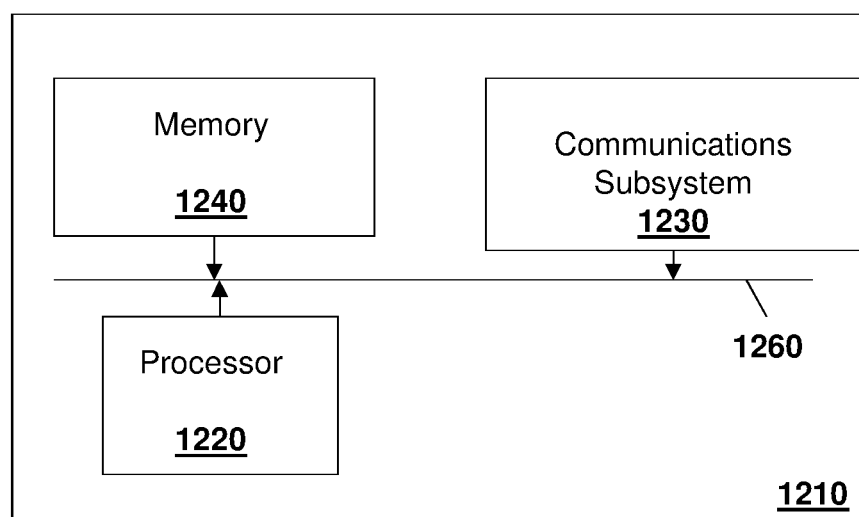
FIG. 12 is a block diagram showing an example computing device capable of being used in accordance with the systems and methods of the present disclosure.

In FIG. 12, computing device 1210 includes a processor 1220 and a communications subsystem 1230, where the processor 1220 and communications subsystem 1230 cooperate to perform the methods of the embodiments described herein.

The processor 1220 is configured to execute programmable logic, which may be stored, along with data, on the computing device 1210, and is shown in the example of FIG. 12 as memory 1240. The memory 1240 can be any tangible, non-transitory computer readable storage medium, such as optical (e.g., CD, DVD, etc.), magnetic (e.g., tape), flash drive, hard drive, or other memory known in the art. In one embodiment, processor 1220 may also be implemented entirely in hardware and not require any stored program to execute logic functions.

Alternatively, or in addition to the memory 1240, the computing device 1210 may access data or programmable logic from an external storage medium, for example through the communications subsystem 1230.

The communications subsystem 1230 allows the computing 1210 to communicate with other devices or network elements. The communications subsystem 1230 may use one or more of a variety of communications types, including but not limited to cellular, satellite, Bluetooth™, Bluetooth™ Low Energy (BLE), Wi-Fi, wireless local area network (WLAN), wireless personal area networks (WPAN), near field communications (NFC), ZigBee or any other IEEE 802.15 low power technology, wired connections such as Ethernet or fiber, among other options.

As such, a communications subsystem 1230 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 1230 will be dependent upon the communication network or communication technology on which the sensor apparatus is intended to operate.

Communications between the various elements of the computing device 1210 may be through an internal bus 1260 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at an autonomous vehicle for signaling a refueling attendant, the method comprising:
   confirming that the autonomous vehicle is proximal to a refueling station;
   providing a signal to the refueling attendant;
   waiting for refueling to commence; and
   if, after a threshold period, refueling has not commenced, repeating the providing the signal.

2. The method of claim 1, wherein the providing the signal comprises providing an audio or visual indicator from the autonomous vehicle.

3. The method of claim 1, wherein the providing the signal comprises sending a wireless signal to a station receiver at the refueling station.

4. The method of claim 3, wherein the sending is performed over a short range wireless network associated with the refueling station.

5. The method of claim 3, wherein the sending utilizes a network server on which the refueling station has registered.

6. The method of claim 1, wherein the providing the signal comprises sending a wireless signal to a mobile device associated with the refueling attendant.

7. The method of claim 6, wherein the sending is performed over a short range wireless network associated with the refueling station and wherein the mobile device is paired with a station receiver at the refueling station.

8. The method of claim 1, further comprising detecting that refueling has commenced based on short range communications between the autonomous vehicle and the refueling station.

9. The method of claim 8, wherein the short range communications comprises near field communications between the autonomous vehicle and a tag on a fuel nozzle.

10. The method of claim 1, further comprising, after providing the signal:
receiving a request to move to a waiting area; and
receiving a subsequent request to move to a refueling pump.

11. A computing device associated with an autonomous vehicle for signaling a refueling attendant, the computing device comprising:
a processor; and
a communications subsystem,
wherein the computing device is configured to:
confirm that the autonomous vehicle is proximal to a refueling station;
provide a signal to the refueling attendant;
wait for refueling to commence; and
if, after a threshold period, refueling has not commenced, repeat the providing the signal.

12. The computing device of claim 11, wherein the computing device is configured to provide the signal comprises by providing an audio or visual indicator from the autonomous vehicle.

13. The computing device of claim 11, wherein the computing device is configured to provide the signal by sending a wireless signal to a station receiver at the refueling station.

14. The computing device of claim 13, wherein the computing device is configured to send the wireless signal over a short range wireless network associated with the refueling station.

15. The computing device of claim 13, wherein the computing device is configured to send the wireless signal using a network server on which the refueling station has registered.

16. The computing device of claim 11, wherein the computing device is configured to provide the signal by sending a wireless signal to a mobile device associated with the refueling attendant.

17. The computing device of claim 16, wherein the computing device is configured to send the wireless signal over a short range wireless network associated with the refueling station and wherein the mobile device is paired with a station receiver at the refueling station.

18. The computing device of claim 11, wherein the computing device is further configured to detect that refueling has commenced based on short range communications between the autonomous vehicle and the refueling station.

19. The computing device of claim 11, wherein the computing device is further configured to, after providing the signal:
receive a request to move to a waiting area; and
receive a subsequent request to move to a refueling pump.

20. A non-transitory computer readable medium for storing instruction code for signaling a refueling attendant, which when executed by a processor of a computing device associated with an autonomous vehicle cause the computing device to:
confirm that the autonomous vehicle is proximal a refueling station;
provide a signal to the refueling attendant;
wait for refueling to commence; and
if, after a threshold period, refueling has not commenced, repeat the providing the signal.

* * * * *